(12) United States Patent
El Kadi et al.

(10) Patent No.: US 6,391,277 B1
(45) Date of Patent: May 21, 2002

(54) BAYER PROCESS FOR PRODUCTION OF ALUMINA TRIHYDRATE

(75) Inventors: Bassam El Kadi, Aix en Provence; Philippe Clerin, Saint Savournin, both of (FR)

(73) Assignee: Aluminium Pechiney, Paris (FR)

( * ) Notice: Subject to any disclaimer, the term of this patent is extended or adjusted under 35 U.S.C. 154(b) by 0 days.

(21) Appl. No.: 09/529,402
(22) PCT Filed: Nov. 16, 1998
(86) PCT No.: PCT/FR98/02443
  § 371 Date: Jul. 5, 2000
  § 102(e) Date: Jul. 5, 2000
(87) PCT Pub. No.: WO99/25653
  PCT Pub. Date: May 27, 1999

(30) Foreign Application Priority Data

Nov. 17, 1997 (FR) .............................. 97-14590

(51) Int. Cl.⁷ ............................. C01F 7/00; C22B 21/00
(52) U.S. Cl. ........................ 423/629; 423/625; 423/121; 423/124
(58) Field of Search ................................ 423/121, 122, 423/124, 127, 625, 629

(56) References Cited

U.S. PATENT DOCUMENTS

| 2,380,804 A | 7/1945 | Tiedemann |
| 3,649,184 A | 3/1972 | Featherston |
| 4,049,773 A | 9/1977 | Mejdell et al. |
| 4,238,159 A | 12/1980 | Tielens et al. |
| 5,653,947 A | * 8/1997 | Lamerant ..................... 423/121 |
| 6,217,622 B1 | * 4/2001 | Hiscox ........................ 423/111 |

OTHER PUBLICATIONS

Chemical Abstracts, vol. 107, No. 26, Dec. 28, 1987, "Effect of Turbulent Agitation on the Rate of Aluminum Hydroxide Precipitation", Kalistratov; A.A., CAS 107:240235.

* cited by examiner

Primary Examiner—Steven Bos
(74) Attorney, Agent, or Firm—Dennison, Schultz & Dougherty

(57) ABSTRACT

An improvement in the Bayer process for producing alumina trihydrate in which bauxite ore is digested in a mixture with a digestion sodium aluminate liquor to produce a slurry, the slurry is settled to remove undigested residues therefrom and produce a pregnant liquor of sodium aluminate and alumina trihydrate is precipitated from the pregnant liquor in the presence of alumina trihydrate recycled as seed. When beginning the precipitation, an aliquot of the pregnant liquor with recycled alumina trihydrate is removed, subjected to mechanical action of an intensity and for a time sufficient to cause formation of seeds, and returned with the formed seeds to the beginning of the precipitation.

10 Claims, 3 Drawing Sheets

BAYER PROCESS FOR PRODUCTION OF ALUMINA TRIHYDRATE

FIELD OF THE INVENTION

The invention relates to a process for manufacturing of alumina trihydrate by precipitation in the presence of a seed consisting of a pregnant sodium aluminate liquor derived from the BAYER process, in order to separately control the sodium content and the particle size distribution of the precipitated alumina trihydrate, while maintaining high productivity.

The physicochemical characteristics of alumina trihydrate, in particular the purity, particle size distribution, the size of elementary crystallites and the degree to which they agglomerate in more or less friable grains, are parameters that control the properties of alumina hydrate and of the resulting alumina. These characteristics must be adapted as a function of product applications; metallurgical alumina for the production of aluminum by igneous electrolysis or technical aluminas for use in a wide variety of fields such as flame retarding fillers for plastics, refractory materials, abrasives, ceramics and catalysts.

These characteristics are interdependent in a conventional BAYER process of the American or European type, which makes it difficult to adapt the alumina perfectly to its final application. Thus, an alumina producer who has a Bayer process with which he can make an alumina trihydrate while adjusting the particle size distribution independently of the residual sodium content will find that this manufacturing process gives him a considerable advantage in terms of operating flexibility. This advantage will be particularly appreciable if the performances of the process in terms of productivity and reliability are maintained, or even improved, compared with values obtained with known processes.

DESCRIPTION OF RELATED ART

The Bayer process is widely described in the specialized literature, and is the essential technique used for manufacturing of alumina for transformation into aluminum by igneous electrolysis or for use in the state of a hydrate, a transition alumina, calcinated alumina, sintered or molten alumina, within a wide range of applications in the engineering aluminas field.

According to this process, the bauxite ore is digested when hot by means of an aqueous solution of sodium hydroxide with an appropriate concentration, thus causing extraction of the alumina and resulting in a slurry composed of particles of undigested residue in a sodium aluminate solution called "aluminate liquor".

In general, this slurry is then diluted to separate undigested residues in the aluminate liquor, by settling. Once "cleaned", this liquor is cooled to a temperature at which it is in a strongly unbalanced supersaturated state. At this stage, it is called "pregnant liquor". The liquor saturation or stability state, is characterized by the following ratio by weight:

$$R_p = \frac{\text{concentration of dissolved Al}_2\text{O}_3 \text{ (in g/l)}}{\text{caustic concentration Na}_2\text{O (in g/l)}}$$

This strong unbalance results in the crystallization of alumina trihydrate in a phenomenon called "precipitation", which is unstable but reacts slowly, and it is essential that it must be perfectly controlled. After precipitation, the sodium aluminate liquor, depleted in alumina due to the precipitation and called the "spent liquor", is recycled after concentration to ore digestion.

Precipitation is a complex phenomenon including crystallization, crystal growth and agglomeration of crystallites leading to the production of particles of alumina trihydrate. This phenomenon takes place slowly, so that this pregnant liquor has to be circulated in a sequence of tanks with partial recycling of the trihydrate produced, this recycling being designed to facilitate precipitation of crystallites with respect to the seeds or "nuclei". The "aluminate slurry" is the medium that circulates in the precipitation line; it is a mix of aluminate liquor and solid alumina trihydrate particles which have just precipitated or which are resulting from agglomeration or crystal growth of trihydrate particles drawn off near the downstream end of the precipitation line and reinjected at the upstream end of the precipitation line. Particles recycled due to their small size are called "fines". In practice, precipitation is carried out differently in European BAYER lines and in American BAYER lines.

American BAYER lines use an aluminate liquor with a lower caustic concentration; although the soda is less productive (less alumina trihydrate is produced for the same volume of aluminate liquor) however it is rich in seeds. The added recycled trihydrate is a seed and a regulating makeup carried out at the beginning of precipitation, both in the first step called "agglomeration" and in subsequent "feed" or "growth" steps.

European BAYER lines use an aluminate liquor with a much higher caustic concentration. This means that more trihydrate is obtained for a given volume (see below for the definition of productivity) but makes precipitation more difficult since there are far fewer crystallization seeds. In general, the pregnant liquor is mixed with seeds in a first tank, called the seed tank, to form a "pregnant slurry". Precipitation continues in subsequent tanks called "precipitators" either by feeding existing grains or crystallites, or by the appearance of new seeds, or by the formation of particles by agglomeration of crystallites.

In the American and European processes, direct recycling from alumina trihydrate produced proves to be inadequate when it is required to make a product with precise characteristics. U.S. Pat. No. 3,486,850 and U.S. Pat. No. 4,311,486 recommend that the trihydrate produced should be sorted before recycling fines at several steps of the precipitation. In European processes, simply recycling alumina trihydrate is not sufficient to give good control over the size and structure of precipitates. "Particle size crises", in which the trihydrate produced is either too fine or too coarse, occur suddenly, and the remedy must be applied very cautiously without any immediate effect—other characteristics of the trihydrate produced must not be disturbed, and the productivity of the pregnant aluminate liquor during precipitation must not be reduced.

It is known that the addition of seeds produced outside the BAYER line can make process control more flexible. Thus, FR-A-2 709 302 proposes recovering sorted fines from another precipitation line. FR-A-1 525 302 proposes seeding of an auxiliary pre-calibrated seed in the form of an ultrafines gel at the beginning of precipitation, and EP-A-0 344 469 proposes ground trihydrate as an auxiliary pre-calibrated seed.

But these solutions are not economic. The solution in FR-A-1 525 302 is expensive, and the solution recommended in FR-A-2 709 302 is only attractive if there is a second precipitation line on the same industrial site. Finally, the solution provided by EP-A-0 344 469 is very expensive since it is necessary to obtain a very closely controlled particle size distribution of the ground seeds, in order to obtain a satisfactory quality of alumina trihydrate.

Thus, even making use of prior art, the expert in the field has no reliable and inexpensive industrial process by which he can make a trihydrate, with independent control over the BAYER line operating parameters, particularly with an influence on the particle size distribution and the residual sodium content, while maintaining good productivity.

Reliability includes precise and stable long term reproduction of the target characteristics starting from adjustment set values, therefore requiring low dispersion of the characteristics obtained compared with the target characteristics.

Productivity means productivity of the pregnant sodium aluminate liquor derived from alkaline digestion of bauxite using the Bayer process which precipitates during precipitation in the presence of a seed. The weight ratio Rp characteristic of the saturation state of alumina dissolved in the liquor in the Bayer cycle, can be used to determine the productivity of the liquor during the precipitation. This is defined by the quantity of alumina restored, in the form of alumina trihydrate, after crystallization of the pregnant liquor, compared with a given volume of pregnant liquor. The productivity, expressed in kilograms of alumina per cubic meter of liquor (kg of $Al_2O_3/m^3$), is obtained by multiplying the variation of Rp before and after precipitation by the caustic concentration of the pregnant liquor.

In general, this concentration is higher in European type Bayer processes (more than ≈140 g $Na_2O$/l) than in American type processes (≈120 g $Na_2O$/l) and this is why the precipitation productivity of the pregnant liquor is considered to be good when it exceeds 70 kg $Al_2O_3/m^3$ for an American type Bayer process and when it exceeds 80 kg $Al_2O_3/m^3$ for a European type Bayer process.

Particle size crises observed on European BAYER lines are related to the fact that the aluminate liquor is less pregnant, which prevents the presence of a large quantity of seeds in the seed tank. American lines, currently less sensitive to the particle size crises described above, could eventually become more sensitive because international quality standards impose a reduction in the caustic content in the alumina produced, which implies that the degree of alumina supersaturation of the aluminate has to be reduced. Thus, introduction of a means of generating seeds to control the particle size distribution and residual sodium content in the trihydrate independently is useful for all BAYER lines, of the American type and the European type, regardless of the size of these installations.

SUMMARY OF THE INVENTION

The process according to the invention is based on the surprising observation that if intense mechanical action is applied to a part of the slurry at the beginning of precipitation, the formation of seeds or trihydrate nuclei that act as seeds is observed several tens of hours later. Several types of intense mechanical action were carried out, firstly by grinding with a vibrating grinder, and also by cavitation at high frequency with a sonochemical device, and by intense shear of the slurry using a turbine or a centrifugal pump.

"Beginning of precipitation" means a step in which the location of the aluminate liquor is near the upstream end of the precipitation line, for example in the seed tank or the first precipitation tank in a European type BAYER line or in the agglomeration tank or preferably the first feed tank, in an American type BAYER line.

The various types of mechanical actions envisaged in this invention are carried out on an aliquot of the slurry drawn off at the beginning of precipitation and returned into the Bayer circuit preferably into the same tank or after the drawing off point, after the mechanical action has been applied. Depending on the mechanical action considered, the aliquot corresponds to a variable fraction of the slurry in circulation in the Bayer circuit; typically it represents 5 to 40% and preferably between 10 and 30% of the slurry for actions causing intense shear, and in much lower proportions (less than 1%) for grinding and application of ultrasounds.

The mechanical action may be grinding, preferably done by a vibrating grinder, of part of the drawn of f slurry, which is then reinjected near the upstream end of the precipitation line.

The mechanical action may also be cavitation at high frequency obtained by means of an ultrasound generator applied to part of the slurry being recirculated on a point near the upstream end of the precipitation line.

The mechanical action may also be caused by a device generating a laminar or turbulent flow in the slurry, within which there are large speed gradients that could not be obtained by simple implantation of rings or baffles counteracting the natural circulation of the slurry.

Seeds are probably created fairly early, but their size is such that they are undetectable with routine testing means, in this case a particle counter, which can only detect particles if their diameter exceeds 0.5 to 1 $\mu$. The applicant observed that if this action (which has no immediate effect) is applied continuously, after a few weeks it becomes easier to control the size and morphology of the alumina trihydrate particles. This type of continuous or regularly repeated mechanical action avoids annoying "particle size crises" encountered in high productivity processes.

This phenomenon takes place very slowly, and the first effects only occur after several tens of hours. The said effects take a particularly long time to observe since part of the trihydrate produced is recycled. They result in:

either a gradual increase in the size of grains if the number of seeds added is insufficient, a phenomenon which in the past was compensated by action on the temperature of the slurry in the seed tank, with a direct influence on the residual sodium content of the trihydrate produced, or by stabilization of the size of particles produced by the precipitation line, if the added seeds exceed a critical value; as the number of seeds added in this way increases, the equilibrium size of particles produced during the precipitation cycle reduces.

In order to clarify the situation, the applicant isolated part of the pregnant aluminate slurry at the beginning of precipitation and observed the initial effects and the long term effects of various mechanical actions produced in the said slurry, in an auxiliary tank.

This phenomenon was demonstrated in the laboratory by means of a special device; a circuit connecting an auxiliary tank to the seed tank, with shear being applied in the auxiliary tank and which, after simultaneously stopping the pregnant slurry feed and the mechanical action, allows nuclei to increase in size sufficiently so that their presence can be detected. By accelerating observations of the results, this device could be used to compare different means of creating the shear and defining parameters creating conditions under which an optimum seed can be produced. It was also used to define a preferred device for implementation of the invention under industrial conditions.

It is thought that the effect of introducing shear into the slurry is firstly to separate a number of crystallites, or even particles, from previously formed large agglomerates. Incidentally, this shear may also incite secondary crystallization phenomena. Laboratory tests have shown that the number of seeds generated is particularly high if the slurry is subjected to intense shear for a given time. The effect of this generation only becomes significant (in other words has an influence on the particle size distribution of the alumina trihydrate produced) above a certain critical shear rate, and if it is maintained at least for a given critical time. This critical shear rate and this critical time depend on the means used to generate the mechanical action introduced into the slurry.

Two of the tested mechanical means for generating seeds proved to be useful:
  a shear turbine operating at maximum speed but for a variable time, depending on the number of nuclei to be produced,
  a centrifugal pump operating either on request, or continuously but with a variable flow depending on the number of nuclei to be produced. This is an additional pump added to the existing pump(s) that circulate slurry in the precipitation line. One preferred solution is to make a bypass circuit at a tank at the beginning of precipitation (for example the seed tank) by which a high recirculation flow may be imposed on the pregnant aluminate slurry.

Concerning the shear turbine, turbulence and shear forces initiating within the air gap between the stator and rotor have a controlling influence on the generation of seeds. The high frequency of mechanical shocks on the stator-rotor system at high peripheral speeds creates a very strong dispersion of slurry particles. A significant particle generation effect is observed when the peripheral speed of rotor ribs exceeds 20 m/s. In the specific case of a shear turbine, the order of magnitude of shear speeds imposed on the slurry when it enters the stator-rotor air gap may be estimated at $10^3$–$10^4$ $s^{-1}$.

The applicant observed that the amount of energy used can be reduced by performing the shear on an aliquot of the pregnant slurry drawn off and returned into the seed tank. The drawn of f aliquot is part of the aluminate slurry flow such that the number of seeds created and recycled in the seed tank is sufficient. For a given mechanical energy, the resulting shear intensity depends on the average circulation speed of the slurry; as the circulation speed reduces, it becomes easier to reach this critical shear. furthermore, wear due to abrasion by slurry particles is lower when the average circulation speed of the slurry is lower.

Thus, one or more shear turbine(s) are either dipped directly into the seed tank, or may be mounted on one (or several) recirculation circuit(s) on the seed tank, where it (they) acts (act) as a pump (pumps).

Concerning the centrifugal pump, the applicant observed that it was advantageous to place a recirculation circuit on the auxiliary tank at the feed tank, which means that the recirculation flow is significantly greater than the auxiliary tank feed flow. The critical shear is more easily achieved in this auxiliary tank, particularly if the high flow recirculation pumps the slurry into the high shear area several times. With this type of circuit with a high recirculation flow on the auxiliary tank, itself fed by a slurry aliquot from the seed tank returning to the seed tank at a lower flow rate, the generated hourly particle flow is significantly greater than what could be obtained with a shear turbine with the same power.

Sufficiently large pumps are found in the shops to feed a single recirculation circuit and to generate the required number of seeds. This is why, in the preferred embodiment of the invention, it is only necessary to insert a centrifugal pump into this recirculation circuit, with mechanical and hydraulic characteristics comparable to those of the existing centrifugal pump, used to circulate the slurry in the precipitation line. A second additional pump with lower mechanical and hydraulic characteristics, is used for return into the seed tank from the auxiliary tank.

If only one tenth of the slurry in the seed tank is drawn off to feed the auxiliary tank, in which the recirculation flow is at least 5 times higher, the number of seeds generated and returned into the seed tank is sufficient for the entire slurry entering the seed tank.

For grinding, the seed creation mechanism is different; grains are broken and the highly active rupture surfaces are the source of secondary crystallization. In order to be able to control the number of seeds created, it is preferable to act only on a very small fraction (less than 1% typically of the order of 1 per thousand) of the total slurry circulating in the Bayer circuit precipitation line.

The preferred grinding device according to the invention is a vibrating grinder comprising two grinding tubes which are forced to move in an approximately circular rotation movement by vibrations caused by out-of-balance masses. The two tubes are usually filled to 65% by grinding bodies. Pulses transferred to the grinding bodies through the tube walls generate impacts imposed on the slurry passing through the grinder. Depending on the material to be treated and the required fineness, balls, bars, or even cylpeps (segments of bars) of different sizes and made of different materials, may be used as grinding bodies. The use of steel cylpeps has proven to be beneficial within the framework of the invention.

The very low proportion of slurry to be treated makes it possible to use relatively low power devices (of the order of 20 kW) since they will only need to treat slurry flows of the order of about 1 m$^3$/h, whereas the slurry flow in an industrial Bayer line is of the order of a thousand m$^3$/h.

The use of high power ultrasounds (typically 100 W/cm2 at 20–500 kHz) causes an acoustic cavitation phenomenon that also causes breakage of grains with the creation of very active rupture surfaces. As for grinding, it is preferable to act only on a small proportion, typically less than 5%, of the slurry in circulation in the Bayer circuit precipitation line. The slurry in recirculation passes through an-auxiliary tank in which ultrasounds are generated.

Regardless of the type of mechanical action used, it is useful to add an auxiliary tank in the circuit through which the slurry aliquot to be treated passes. In all these cases, it has been shown that it is useful to add an alumina supersaturated liquor to the slurry in the auxiliary tank, for example an aliquot of the pregnant liquor drawn off at the very beginning of the precipitation. Firstly, this adding dilutes solids content and the resulting lower viscosity facilitates operating conditions, and also and especially significantly increases the Rp of the aluminate slurry and thus improves the efficiency of fines generation.

BRIEF DESCRIPTION OF THE DRAWINGS

The process according to the invention will be better understood after reading the detailed description of its implementation.

DESCRIPTION OF THE PREFERRED EMBODIMENTS

Figure 1:
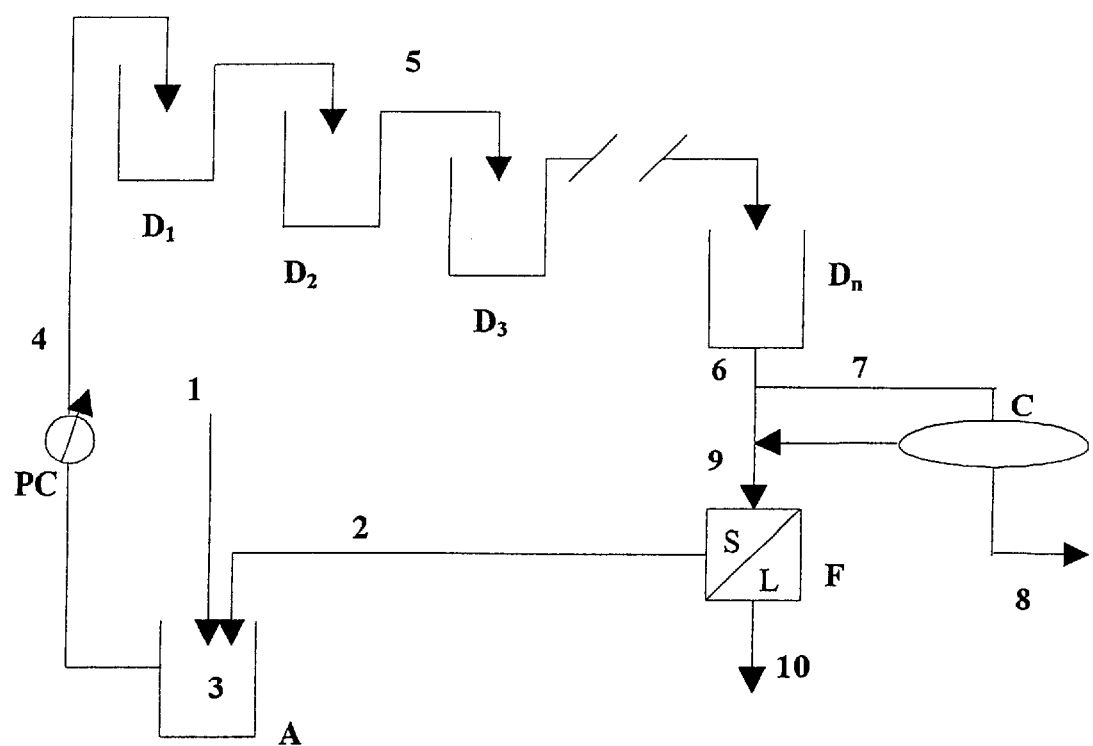
FIG. 1 diagrammatically shows the precipitation steps in a European type BAYER line.

The following examples are based on a preferred embodiment of the invention applied to European type BAYER lines with high precipitation productivity, as shown on the diagram in FIG. 1. The pregnant aluminate liquor 1, with an Rp close to 1.2 and a caustic concentration between 140 and 180 g of Na2O/l, is mixed with alumina trihydrate 2 recycled at the end of precipitation and impregnated with crystallized liquor. The pregnant slurry 3 thus formed has an Rp close to 1.0. After 15 minutes residence in the seed tank A, the slurry 4 is entrained under the effect of pump PC to the series of precipitators D1, D2, D3, . . . , Dn. A part 7 of the slurry is separated from the crystallized slurry 6 so as to obtain classified alumina trihydrate 8 by classification C, to be used in the final treatment (washing, calcination, etc.). The other part 9 is filtered F, the filtered crystallized liquor 10 is further concentrated for recycling for further digestion of the bauxite, whereas the filtrate is alumina trihydrate 2 used as a seed and mixed with the pregnant aluminate liquor 1.

To demonstrate the influence of high shear imposed within the slurry, the applicant made a small experimental device reproducing an auxiliary seed tank fed with pregnant aluminate slurry 3 from a European BAYER line satisfying this description.

EXPERIMENTAL DEMONSTRATION

The experimental device was used to compare the variation in the crystallization of pregnant aluminate liquor to which mechanical action had been applied (the test tank) with the crystallization of the same pregnant aluminate liquor to which mechanical action had not been applied (reference tank). These two 1 m$^3$ tanks are fed continuously and in parallel at the same flow, with a pregnant aluminate slurry 3 with Rp=0.96 and containing 155 g of Na$_2$O/l originating from the seed tank in a BAYER line. In these two tanks, the slurry is continuously stirred mechanically and is kept at a temperature of 60° C. The feed time is significantly greater than the residence time of the slurry in the tanks, to ensure that the tanks are uniformly mixed.

The pregnant aluminate slurry in the test tank is subject to shear with variable intensity and for a variable duration, the two tanks always being fed. The feeds into the two tanks are then cut off at the same time as the mechanical action is stopped.

The tanks are then isolated and kept stirred and at high temperature so that crystallization can take place. Samples are taken at regular time intervals to monitor changes in the particle size distribution and the precipitation dynamics. Due to the measurement range of the analysis instruments (particle counters), very fine particles smaller than 1 μm cannot be detected, and these particles can only be detected and quantified after crystal growth.

Tests with a Shear Turbine

We used an ULTRA TURRAX (registered trade mark) shear turbine operating at 2900 rpm with a dissipated power of 6.3 kW. The maximum shear generated by the turbine is close to the peripheral part of the mobile part, the speed at the periphery reaching 23 m/s. The turbine dipped directly into the test tank. Several shear durations were tested varying from 0.075 to 3 times the average residence time of the slurry in the test tank.

The results were expressed as the ratio of the nucleation frequency in the test tank and in the reference tank. Starting from a shear duration equal to 0.375 times the average residence time of the slurry in the test tank, the turbine generated ultra fines increasing in size after 48 hours into fines (with an average diameter of between 1 and 2 μ) detectable by the particle counter. The number of these ultra fines increases with the shear duration and is between 10 and 80 times greater than the number of ultra fines created without prior shear.

Regardless of the tested shear time, the hourly flow of fines generated by this shear is approximately constant. In this case it was measured at between 3.5+1 and 4.5±1 10$^{13}$ particles per hour.

Tests with a Centrifugal Pump

We used a SCHABAYER M40 centrifugal pump operating in a closed circuit on a bypass on the test tank itself. This pump operated for a significantly longer time than the average residence time of the slurry in the test tank. The ratio between the pump recirculation flow and the tank feed flow was varied between 1 and 15.

With a ratio between the pump recirculation flow and the tank feed flow equal to about 10, the hourly flow of generated particles was measured at 3.5±0.5 10$^{14}$ particles per hour.

It is difficult to specify the shear rate reached within the slurry when it is generated by the centrifugal pump. But apparently the shear effect is determined by the linear speed of the slurry at the entrance to the disk blades; this speed depends partly on the mechanical and hydraulic characteristics of the pump, and also on the ratio between the pump recirculation flow and the tank feed flow. Shear speeds imposed by the pump on the slurry are probably lower than the speeds generated by the shear turbine, but high flow recirculation enables the slurry to pass in the high shear zone several times before returning to the seed tank. When the ratio between the recirculation flow and the feed flow exceeds 5, it is found that generation of fines is sufficient to start to have an influence on the particle size in the slurry.

Tests with a Vibrating Grinder

We used a PALLA (registered trade mark) vibrating grinder with its two cylinders filled to 65% with steel cylpeps. The overflow level of the upper cylinder was adjusted to the maximum so that the grinder operates practically full (maximum residence time for a given flow). The grinding load used is as follows:

upper cylinder 120 kg of cylpeps made of 16 mm steel lower cylinder 120 kg of cylpeps made of 12 mm steel All tests were carried out with the following operating parameters:

| Flow (l/h) | 300 | 100 | 300 |
|---|---|---|---|
| Vibration amplitude (mm) | 8 | 8 | 12 |
| Residence time in the grinder (minutes) | 8 | 24 | 8 |

The vibration amplitude on a scale of 6 to 12 mm, corresponds to the diameter of the circular envelope of the trajectory of a point on the vibrating wall.

Regardless of the tested vibration amplitude, the vibrating grinder created many fines and considerable breakage of the hydrate grains. The hourly flow of fines generated by this grinding is approximately constant. In fact, values of between 5.6 and 21.5 $10^{14}$ particles per hour were measured, depending on the grinder operating parameters, the maximum being obtained with 300 l/h and an amplitude of 12 mm.

Tests with Ultrasounds

Particle counts and a particle size distribution analysis were carried out on a reference slurry and on the same slurry after an ultrasound treatment was applied with 100 W/cm2 at a frequency of 20 kHz for 30 minutes.

After the ultrasound treatment, we observed a very large quantity of fine particles with an average diameter D50 below 15 µm. The ratio of the number of particles in the treated slurry and in the reference slurry is between 40 and 60 for particles with a diameter less than 6 µm.

INDUSTRIAL EMBODIMENT

Shear Turbine

Figure 2:
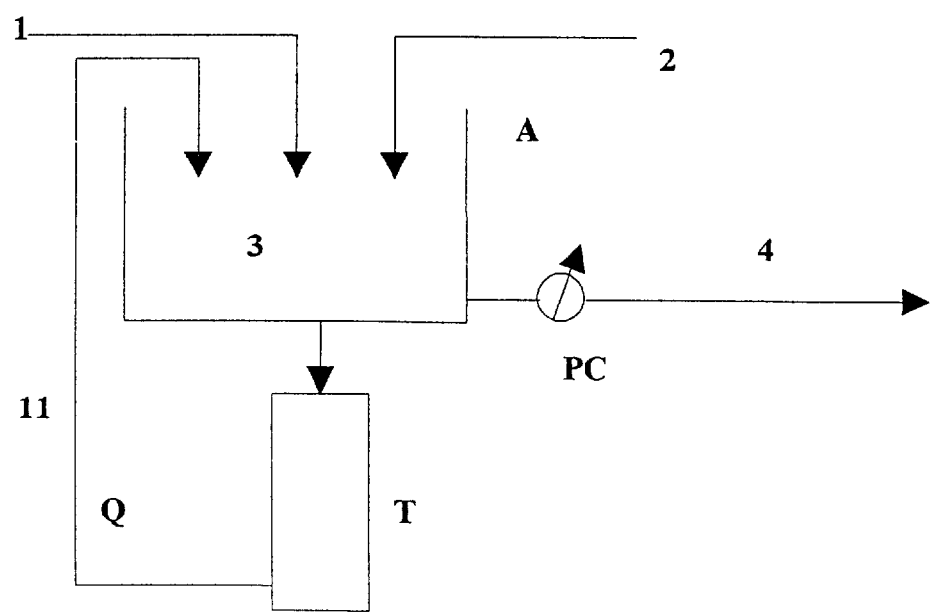
FIG. 2 shows a bypass circuit on the seed tank, in which an aliquot of the pregnant aluminate slurry is circulated by means of a shear turbine that acts as a recirculation pump. This turbine generates high shear according to the invention, in the pregnant aluminate slurry.

FIG. 2 shows a circuit Q in bypass on seed tank A, in which an aliquot 11 of the pregnant aluminate slurry is circulated by a shear turbine T that acts as a recirculation pump.

This turbine generates a high shear according to the invention in the aliquot 11 of the pregnant aluminate slurry 3. Since the generation of seeds is fairly low, several circuits of this type are made in recirculation on the seed tank, since the total flow recirculating in these circuits should be comparable with the slurry flow passing through the seed tank towards the precipitators.

Centrifugal Pump

Figure 3:
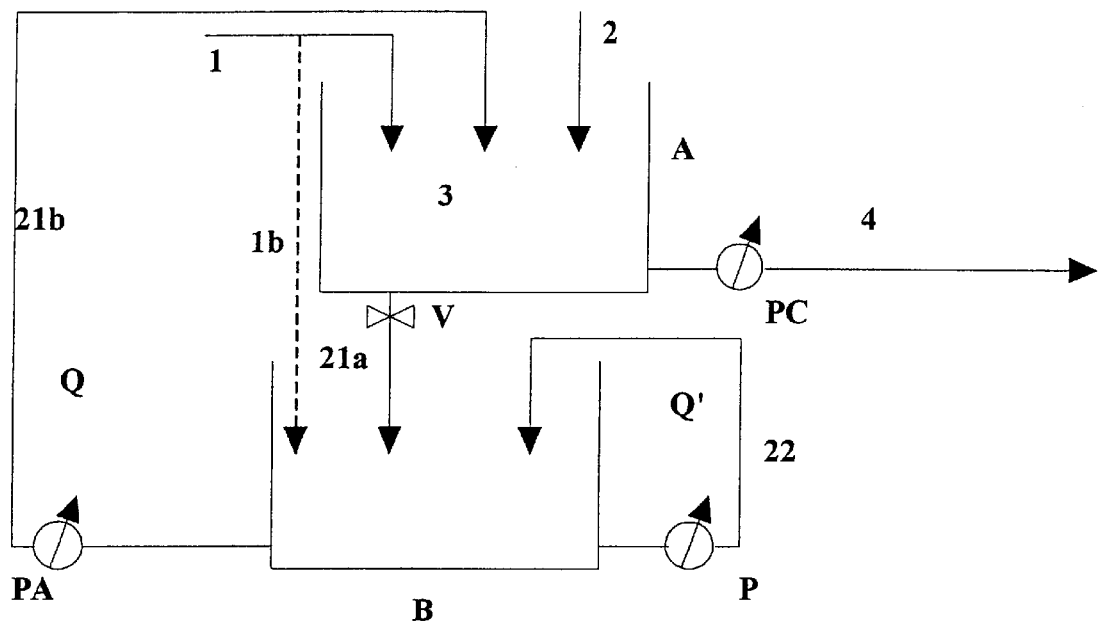
FIG. 3 shows an auxiliary tank fed by a recirculation circuit starting and ending at the seed tank, part of the aliquot passing through the auxiliary tank itself being extracted and recycled with high flow on the auxiliary tank by means of a centrifugal pump.

FIG. 3 shows an auxiliary tank B fed by a recirculation circuit Q starting and ending at the seed tank A. When valve V is opened, the aliquot 21 of the pregnant aluminate slurry 3 is extracted (21a) from the seed tank A and is fed into auxiliary tank B. Part of this aliquot 21 is itself extracted and recycled (22) in a recirculation circuit Q' on the auxiliary tank B by means of a centrifugal pump P. The aliquot 21b is drawn off from auxiliary tank B and directed into seed tank A by means of centrifugal pump PA. The flow of the aliquot extracted 21a and poured 21b into the seed tank A is equal to about one tenth of the flow of aluminate slurry in the line. The centrifugal pump P circulates part 22 of this aliquot 21 in the bypass circuit with a flow more than five times higher.

An advantageous application of the invention consists of also feeding an aliquot 1b of the pregnant aluminate liquor 1 into the auxiliary tank B. The mix thus formed in the auxiliary tank B is then in a more pregnant state. This type of addition encourages precipitation and reinforces the generation of nuclei, by increasing the value of Rp of the slurry 22, part of which is subjected to a high recirculation flow.

Figure 4:
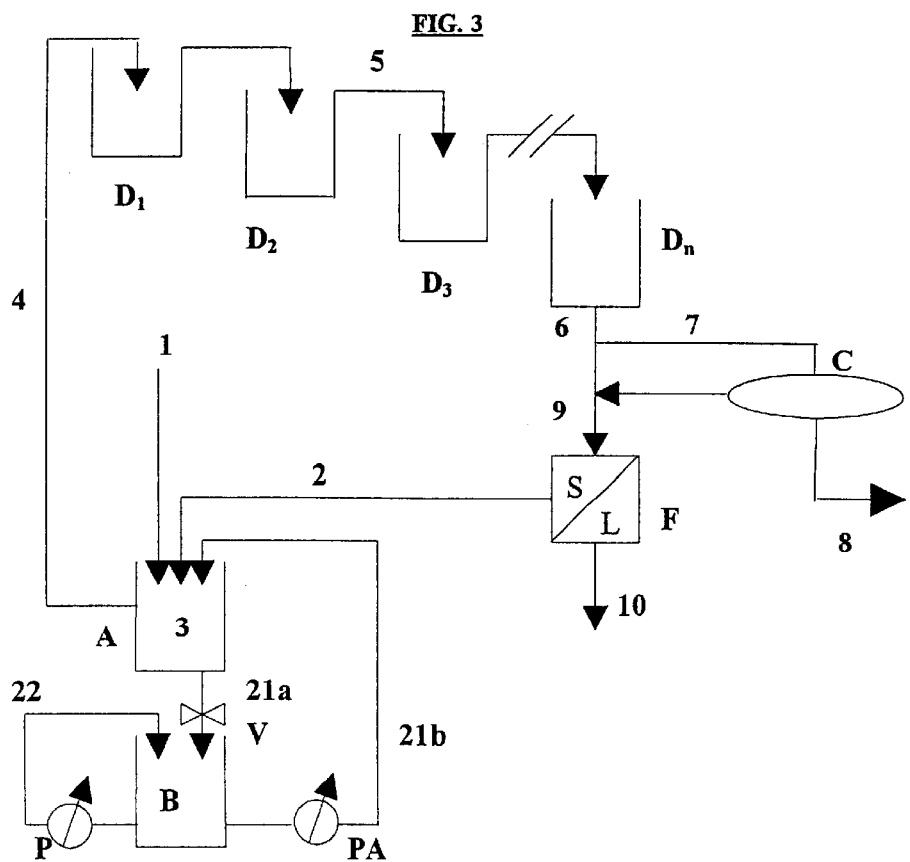
FIG. 4 diagrammatically shows a European type BAYER line with a mechanical seed generation system according to the invention, in bypass on the seed tank.

FIG. 4 shows the device in FIG. 3 adapted to the circuit in the European type BAYER line shown in FIG. 1. The pregnant aluminate liquor 1, with Rp≈1.2 and with a caustic concentration of 140 g Na₂O/l, is mixed with recycled trihydrate 2 impregnated with crystallized liquor. The slurry 3 resulting from this mix enters seed tank A with an Rp close to 0.95. Part 21 of the slurry 3 passes through an auxiliary tank B to be recycled (21b) on the seed tank A. An aliquot of the aluminate liquor 1 (not shown in FIG. 4 to make the drawing more easily readable) may optionally feed auxiliary tank B without passing through the seed tank. A loop circuit is connected to the auxiliary tank B, in which part 22 of the slurry circulates with a higher imposed flow than the auxiliary tank feed flow. The recirculation flow is imposed by a centrifugal pump P that operates continuously such that the ratio between the recirculation flow and the feed flow is kept at a value of between 5 and 15.

The temperature in the seed tank and in the auxiliary tank is kept at 60° C., and then decreases in subsequent tanks. After three weeks, it is found that the size of D50 grains stabilizes at a value of between 60 and 90 µ depending on the chosen ratio of recirculation and feed flows.

Figure 5:
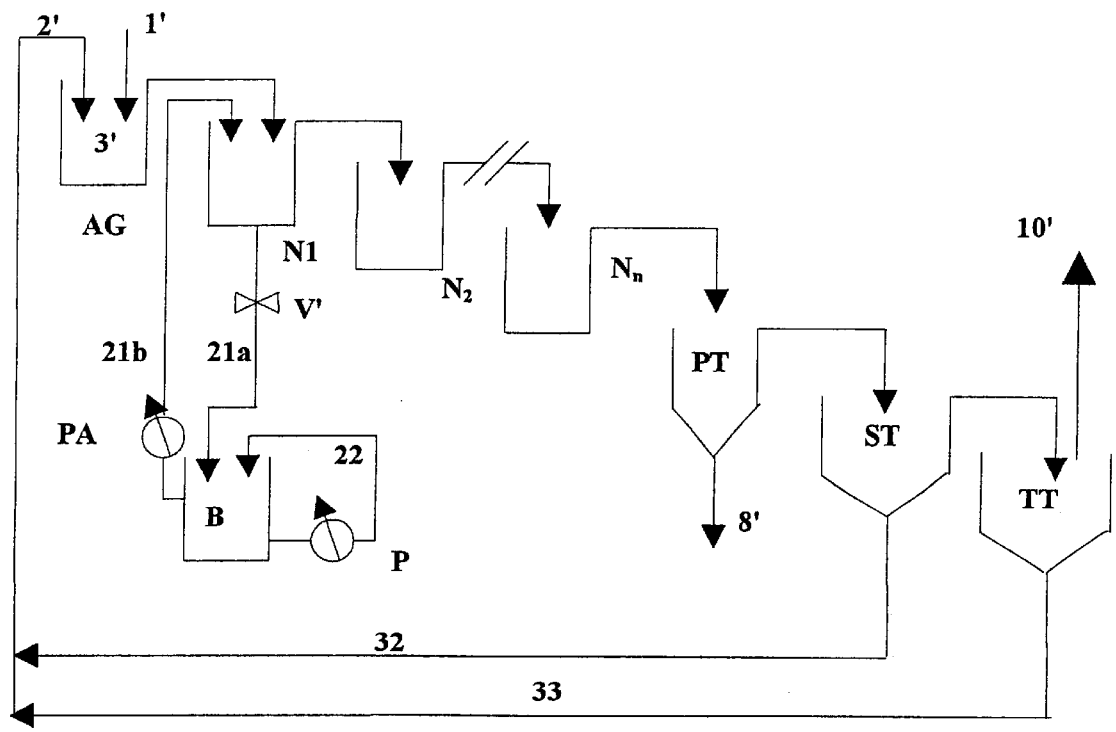
FIG. 5 diagrammatically shows an American type BAYER line with a mechanical fines generation system according to the invention, in bypass on the first growth tank.

FIG. 5 shows the adaptation considered for an American type Bayer circuit in which the device in FIG. 3 is mounted in bypass on the first feed tank N1, fed with the slurry originating from the agglomeration tank AG and mixed with the secondary seed 32 recycled from the secondary thickener ST. The hydrate produced 8' exits from the primary thickener PT in underflow. The crystallized liquor 10' exits from the tertiary thickener TT in overflow, while the tertiary seed 33 exits from the tertiary thickener in underflow to be mixed with the secondary seed 32 and then with the pregnant liquor 1', the slurry 3' obtained then being poured into the agglomeration tank AG. As shown in FIG. 3, it is advantageous, particularly when a circuit is made in bypass on the first feed tank N1, to also feed the auxiliary tank B with an aliquot of pregnant aluminate liquor 1'. This can significantly increase the Rp of the aluminate slurry, which is already less pregnant at this stage.

Vibrating Grinder

Figure 6:
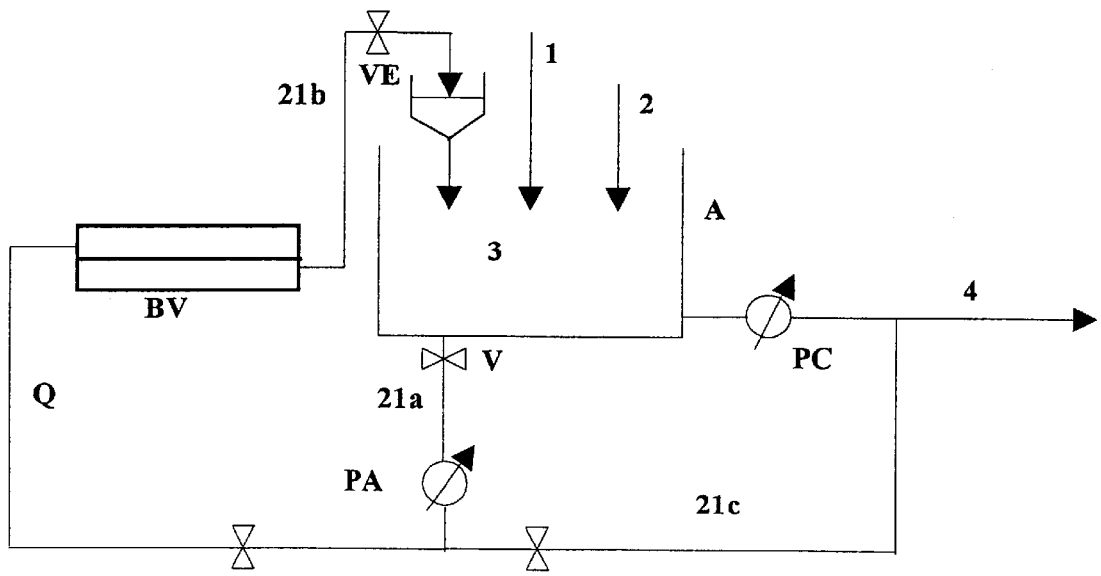
FIG. 6 shows a circuit in bypass on the seed tank, in which there is a circulation of an aliquot of the aluminate slurry that passes through a vibrating grinder.

FIG. 6 shows a circuit Q in bypass on the seed tank A. An aliquot 21a of pregnant aluminate slurry 3 is drawn off using a pump PA and a valve V. The slurry is directed towards a vibrating grinder BV working under pressure. The slurry 21b outlet from the grinder is sent to the seed tank. The flow (of the order of 2 m³/h) is measured by a flow meter or a calibrated vessel placed at the grinder outlet. The flow is adjusted by means of a pinch valve. The excess drawn off slurry 21c is directly reintroduced into the slurry 4 which feeds the first precipitation tank.

ADVANTAGES OF THE PROCESS ACCORDING TO THE INVENTION

The process according to the invention can generate seeds within the slurry in controlled quantities and without involving BAYER line operating parameters which have an influence on the final product quality, for example the residual caustic content.

This process is useful for all processes in which high productivity of the aluminate liquor is important and in which the caustic content is high (greater than ≈140 g Na20/l).

What is claimed is:

1. In a Bayer process for producing alumina trihydrate comprising digesting bauxite ore in a mixture with a digestion sodium aluminate liquor to produce a slurry, settling the slurry to remove undigested residues therefrom and produce a pregnant liquor of sodium aluminate, and precipitating alumina trihydrate from the pregnant liquor in the presence of alumina trihydrate recycled as seed, the improvement comprising, at the beginning of said precipitation, removing an aliquot of the pregnant liquor having recycled alumina trihydrate, subjecting said aliquot to mechanical action of an intensity and for a time sufficient to cause formation of seeds, and returning said aliquot having the formed seeds to the beginning of the precipitation.

2. Process according to claim 1, wherein the precipitation is carried out in a Bayer line which includes a seed tank and precipitators, and the aliquot is taken from and returned to the seed tank.

3. Process according to claim 1, wherein the precipitation is carried out in a Bayer line which includes an agglomeration tank and feed tanks, and the aliquot is taken from and returned to the agglomeration tank.

4. Process according to claim 1, wherein the precipitation is carried out in a Bayer line which includes an agglomeration tank and feed tanks, and the aliquot is taken from and returned to a first feed tank.

5. Process according to claim 1, wherein said mechanical action generates shearing in the suspension, with a maximum deformation speed exceeding $10^3$ $s^{-1}$.

6. Process according to claim 5, wherein the shearing is generated in said aliquot by a shearing turbine.

7. Process according to claim 1, wherein the mechanical action is produced by a method step selected from the group consisting of grinding, ultrasound cavitating, causing laminar flow and causing turbulent flow.

8. Process according to claim 1, wherein the mechanical action is produced by a centrifugal pump.

9. Process according to claim 1, wherein the mechanical action is produced by introducing a means for producing mechanical action directly into a tank containing suspension used at the beginning of the digestion.

10. Process according to claim 1, wherein the mechanical action is produced by disposing a means for producing mechanical action in a recirculation circuit.

* * * * *